3,282,646
PRODUCTION OF SULFUR DIOXIDE
John H. Bonfield, East Aurora, N.Y., and Francis L. Bohn, Chester, Va., assignors to Allied Chemical Corporation, New York, N.Y., a corporation of New York
No Drawing. Filed Dec. 3, 1963, Ser. No. 327,799
16 Claims. (Cl. 23—177)

This invention relates to the production of sulfur dioxide and more particularly to improvements in the production of sulfur dioxide from ammonium bisulfate. This invention further relates to the decomposition of ammonium sulfate in order to recover therefrom substantial and significant quantities of ammonia and sulfur dioxide.

Ammonium sulfate is produced in large quantities as a by-product in the manufacture of ε-caprolactam, the monomer for nylon 6 production, by the hydroxylamination of cyclohexanone and subsequent rearrangement of the cyclohexanone oxime in oleum. This ammonium sulfate is of value as a fertilizer but has no direct use in nylon plants and has accordingly represented a loss of ammonia and sulfur dioxide in the overall nylon process. Thus, it has been desirable to recover from the ammonium sulfate ammonia and sulfur dioxide, which can be converted to products of greater utility and economic value. Existing methods for the production of ammonia and sulfur dioxide by the decomposition of ammonium sulfate generally involve mixing the ammonium sulfate with a solid reactant substrate such as zinc oxide or other heavy metal oxides in at least stoichiometric quantities and subsequent treatment at high temperatures. The products obtained therefrom are metal sulfates which are converted by heating various means to sulfur dioxide and sulfur trioxide. The substrate simultaneously is reconverted back to the metal oxide for further use in the decomposition of ammonium sulfate. The heating operation is carried out in batch-wise fashion with temperatures of at least about 850° C. The heavy metal oxide substrate is subject to attrition and loss, and entails problems of mass transfer in a heterogenous system.

It is an object of this invention to provide a process which yields substantial quantities of commercially useful sulfur dioxide by the decomposition of ammonium bisulfate.

It is another object of this invention to provide an improved process for the production of ammonia and sulfur dioxide from ammonium sulfate.

It is still a further object of this invention to provide an improved method for the successive production of ammonia and sulfur dioxide from ammonium sulfate, which process obviates the use of stoichiometric amounts of reactive solid substrates.

It is still an even further object of this invention to provide a continuous process for the recovery of ammonia and sulfur dioxide independently of one another from ammonium sulfate at relatively low temperatures which products are relatively pure and commercially useful.

Other objects and advantages of the instant invention will become more apparent in the following more complete description and claims.

The production of substantial and significant amounts of commercially useful sulfur dioxide is accomplished by heating ammonium bisulfate at temperatures between 400° C. and 500° C., and during the heating of said ammonium bisulfate contacting it with a stream of non-oxidizing gas and recovering from the gas stream sulfur dioxide in excellent quantities and of good purity. The gas flow rate should desirably be at least .25 ml. per minute per gram of $NH_4HSO_4$ charged and preferably no greater than 3 ml. per minute per gram of $NH_4HSO_4$.

Recovery of ammonia and sulfur dioxide may be accomplished in one process by heating ammonium sulfate at temperatures between 200 and 300° C. thereby causing ammonia gas to evolve and heating the resultant ammonium bisulfate in accordance with the above teachings, i.e., at temperatures between 400 and 500° C. while in contact with the stream of a non-oxidizing gas. In this latter stage, approximately half the ammonia content of the ammonium sulfate is recovered and the molten residual product consists primarily of ammonium bisulfate, from which substantial quantities of sulfur dioxide are recovered.

This first stage may be carried out in conventional vessels equipped with heating means, inlet and outlet means, and means for agitation of fluid contents of the vessel. If it is desired that the procedure be performed batch-wise, the same vessel may be used for both the first and second stage operations. However, it is to be remembered that the second stage operation includes the passage of non-oxidizing gas into the ammonium bisulfate contained therein and accordingly, the equipment suitable for this second stage must contain means for introducing the non-oxidizing gas and an outlet for recovering this gas stream along with the sulfur dioxide evolved. Suitable conventional methods for the enhancement of gas-liquid contact include conversion of the gas stream into finely divided bubbles preferably 1 to 3 mm. in diameter, which are passed vertically upward through the liquid (molten ammonium bisulfate), or are caused to follow a tortuous mechanical or turbulent course in prolonged contact with the liquid; impingement of the gas stream onto or through static or dynamic thin films of the liquid; means for providing large surface areas for gas-liquid contact; and the like. Accordingly, long tubular reactors and horizontally baffled, agitated kettles have been found suitable for this second stage operation since they increase the path taken by the gas flow and thus prolong contact time at given linear flow rate of the gas.

The contact time or residence time is a function of the volume of gas and the volume of liquid $NH_4HSO_4$.

$$\text{Residence time} = \frac{\text{Vol. of liquid}}{\text{Vol. of gas}}$$

The volume of gas is a function of flow rate which in turn is dependent on the amount of charge preferably being between .25 and 3 ml./minute per gram of $NH_4HSO_4$. Since foaming may occasionally be encountered in the second stage, sufficient breakaway space should be provided above the molten salt surface. Detection and control devices may suitably be employed to maintain accurate temperatures, agitation, and gas flow.

The term "non-oxidizing gas" as used herein contemplates gases which do not oxidize inorganic sulfites to inorganic sulfates and include specifically inert gases such as nitrogen, carbon dioxide, and helium. Preferred gases include, in particular, hydrogen, water gas, i.e. a mixture of hydrogen and carbon monoxide, carbon monoxide, and especially hydrogen sulfide. Of all of these specifically mentioned, nitrogen is generally found preferable for the efficient and economical operation of the second stage of the process.

Ammonium bisulfate reacted as such or as residue from the process wherein ammonia is evolved by heating ammonium sulfate at temperatures between about 200 to 300° C. is found to decompose with essentially quantitative evolution of sulfur dioxide upon treatment with the afore-mentioned non-oxidizing gas at temperatures between 400 and 500° C. Preferably, the ammonium bisulfate is heated at temperatures in the range of 400 to 460° C. This broad temperature range of 400 to 500° C., coupled with use of a stream of gas as above specified, has been found to be critical in that when temperatures below 400° C. are employed, the rate of reaction is extremely slow and economically unfeasible. On the other hand, when the temperature employed for the sulfur dioxide recovery is above 500° C., the sulfur dioxide recovery is substantially less than at preferred temperatures and the sublimation of ammonium bisulfite is so great that these operations become inefficient, and industrially unsound. Even at temperatures above 460° C. there is some undesirable sublimation of solid material, i.e., ammonium bisulfite, but this amount does not interfere with subsequent use of the recovered sulfur dioxide in certain operations. Accordingly, one using this process should not use temperature below 400° C. or in excess of 500° C.

When the sulfur dioxide is recovered from ammonium bisulfate, which is one of the products of a first stage decomposition of ammonium sulfate, it is theorized that the sulfate part of the molecule oxidizes the ammonium part, producing sulfite (mainly sulfurdioxide), and nitrogen. Upon this theory the below three equations are postulated to describe the overall process chemically, but of course the instant invention should not be construed only in the light of this theoretical explanation.

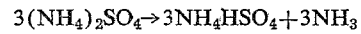
$$3(NH_4)_2SO_4 \rightarrow 3NH_4HSO_4 + 3NH_3$$

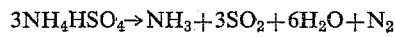
$$3NH_4HSO_4 \rightarrow NH_3 + 3SO_2 + 6H_2O + N_2$$

or, overall

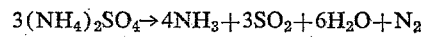
$$3(NH_4)_2SO_4 \rightarrow 4NH_3 + 3SO_2 + 6H_2O + N_2$$

When the sulfur dioxide is recovered as a second stage in the overall decomposition of ammonium sulfate, this two stage overall process permits the separate recovery of ammonia and sulfur dioxide, each of which can be separately purified and employed for various purposes. Both gases are particularly useful for the production of hydroxylammonium sulfate by interaction with ammonium nitrite as shown in the following equations. It is to be noted with particular interest that even a slight contamination of the sulfur dioxide by ammonium bisulfite, which may be carried over by sublimation and entrainment during the sulfur dioxide recovery cycle, is not a disadvantage in the hydroxylammonium sulfate production.

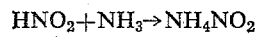
$$HNO_2 + NH_3 \rightarrow NH_4NO_2$$

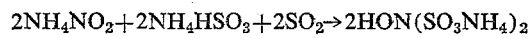
$$2NH_4NO_2 + 2NH_4HSO_3 + 2SO_2 \rightarrow 2HON(SO_3NH_4)_2$$

The hydroxylammonium sulfate is an intermediate in the manufacture of cyclohexanone oxime which is subsequently converted into ε-caprolactam. When the sulfur dioxide recovery is performed using as a starting material ammonium bisulfate, obtained as a reaction product of the decomposition of ammonia sulfate as taught above, the overall procedure may be performed as a continuous operation. This is done by employing two different reaction zones or vessels maintained at appropriate conditions of temperature and gas flow, and transferring at a suitable rate the ammonium bisulfate product resulting from the first stage heating treatment to the second zone where the conditions of temperature (400 to 500° C.) and gas flow are maintained.

In order to more fully illustrate the nature of this invention and the manner of practicing the same, the following examples are presented. These examples are presented for the purpose of illustrating certain embodiments of the present invention and are not to be construed as limitative of the scope of the invention.

*Example 1*

Three hundred and seventy-five grams of ammonium sulfate were placed in a tubular decomposition vessel having a length of 9 inches and a diameter of 1.5 inches provided with heating means, thermocouple, temperature indicators, a gas inlet containing a fine stainless steel screen to cause fine bubble formation, and vapor outlet means. The vessel was heated to melt and maintain the ammonium sulfate at 250° C. Ammonium was collected as it evolved from the molten salt. Evolution of ammonium ceased after about a two hour period.

The residual molten product was primarily ammonium bisulfate, and weighed about 325 grams. The temperature of the salt was subsequently raised to 450° C. and carbon monoxide gas was bubbled through the tube at a rate of 200 ml./minute. Sulfur dioxide was collected as it evolved from the molten salt. After one hour, a salt residue of 36.5 grams remained. Analysis of the emergent vapors indicated the absence of carbon dioxide and the presence of ammonium bisulfate and 30.35 grams of sulfur dioxide. The overall process provided recovery of 60.43% of ammonia and 94% recovery of the sulfur content as sulfur dioxide in a commercially pure state.

*Example 2*

Three hundred and twenty-five grams of ammonium bisulfate, obtained from the first stage operation of Example 1, were charged to the tubular vessel of Example 1 and heated to 450° C. Hydrogen gas was bubbled through the molten salt at a rate of 200 ml./minute. A net decomposition of 188.5 grams of ammonium bisulfate resulted, with the production of 90 grams of sulfur dioxide and 18.14 grams of ammonium bisulfate sublimate in the effluent gas stream. This represented a net sulfur dioxide recovery efficiency of about 95%.

*Example 3*

Ammonium bisulfate, continuously produced by the method of Example 1 was led into the top of an agitated vertical kettle provided with horizontal baffles closely spaced so as to prevent back-mixing of the molten salt. External heating means were employed to maintain the molten salt in the kettle at a uniform temperature of 450° C. Nitrogen gas was passed into the kettle at the bottom and sides through conduits provided with fine stainless steel screens which broke the gas stream into very fine bubbles. Using two hour contact time in the kettle, 200 parts of the original ammonium bisulfate yielded 35 parts of molten salt residue consisting essentially of ammonium pyrosulfate. Sulfur dioxide was recovered from the effluent gas stream at the top of the kettle, in amounts representing 94% efficiency based on the sulfur content of the input salt.

*Example 4*

Hydrogen sulfide was bubbled at the rate of 150 ml./minute through molten ammonium bisulfate, obtained from the first-stage treatment described in Example 1. At a temperature of 450° C., 119.0 grams of ammonium bisulfate was decomposed within 20 minutes to evolve 56.0 grams of sulfur dioxide and 4.6 grams of ammonia together with a quantity of elemental sulfur which corresponded to the amount of hydrogen sulfide used. The recovery of sulfur dioxide was 100% of theory from the ammonium bisulfate and the amount of ammonia recovered was 31.2% of theory. Negligible oxidation of the sulfur from the hydrogen sulfide occurred.

In general in the second-stage treating operation, the rate at which the decomposition reaction occurs is a function of temperature, and rate of flow of the non-oxidizing gas. The data presented in Tables I and II indicate the effect of temperature and gas flow rate, respectively, on the decomposition. As indicated above, the rate of gas flow is important in commercial operations. While decomposition of $NH_4HSO_4$ will occur when the flow rate is negligible, decomposition will take a long time since the non-oxidizing gas serves not only to carry the gas out of the system but to shift the equilibrium of the reaction to yield $SO_2$. In general, the decomposition rate is proportional to the flow rate of the non-oxidizing gas. Thus, a rate in excess of 3 ml./minute per gram of $NH_4HSO_4$ charge will give decomposition so rapid that entrainment occurs.

TABLE I.—EFFECT OF TEMPERATURE ON THE DECOMPOSITION OF NH₄HSO₄ USING NITROGEN GAS [1]

| Temp. C. | NH₄HSO₄ lost as— | | SO₂ Recovery, percent |
|---|---|---|---|
| | (a) NH₄HSO₄ Sublimated g./hr. | (b) NH₄HSO₄ Decomposition g./hr. | |
| 400 | negl. | 38 | 95.0 |
| 450 | 22.7 | 142.3 | 94.0 |
| 470 | 63 | 166 | 93.5 |

[1] Nitrogen gas flow rate 177 ml./min.

TABLE II.—EFFECT OF NITROGEN GAS FLOW RATE ON THE DECOMPOSITION OF NH₄HSO₄ AT 450° C.

| Rate ml./min. | NH₄HSO₄ lost as— | | SO₂ Recovery, percent |
|---|---|---|---|
| | (a) NH₄HSO₄ Sublimated g./hr. | (b) NH₄HSO₄ Decomposition g./hr. | |
| 55 | 28.6 | 68.8 | 96.3 |
| 177 | 22.7 | 142.3 | 94.0 |
| 340 | 35.0 | 185.0 | 97.0 |

We have also discovered that certain substances function as catalysts in the decomposition of ammonium bisulfate into sulfur dioxide under our conditions above specified. These catalysts provide a significantly increased decomposition rate of ammonium bisulfate and further they may be employed in small amounts without substantial sacrifice of benefit received. Such catalysts include, e.g., palladium on charcoal, selenious acid, and mercury sulfate.

In general, catalytic amounts of catalyst relative to the amount of ammonium bisulfate are sufficient to obtain the benefits provided from use of these catalysts. These catalytic amounts are amounts generally within the range of 10 p.p.m. to 20,000 p.p.m. (based on the amount of ammonium bisulfate to be decomposed). While these ranges have been stated, they are not critical but only preferred. For instance, one may employ a greater amount of catalyst than as specified in this range but no particular benefit is derived therefrom and a cost disadvantage due to the cost of the catalyst is encountered.

In order to illustrate the relative effect of the catalysts on the decomposition of the ammonium bisulfate, the following table is presented. In this table the decomposition procedure was performed by the method outlined above and in accordance with Example 1.

TABLE III.—RELATIVE DECOMPOSITION RATES OF NH₄HSO₄ WITH VARIOUS CATALYSTS

| Catalyst | Amount present % | Relative Rate |
|---|---|---|
| None | | 1 |
| Selenious acid (H₂SeO₃) | 1 | 4.1 |
| Mercury Sulfate | 1 | 4.0 |
| Hydrogen Sulfide | ([1]) | 5.8 |
| 5% Palladium on Charcoal | [2] 0.025 | 4.6 |

[1] Carrier Gas at 177 ml./min.
[2] As Palladium.

It is to be noted that hydrogen sulfide has been included herein since it not only acts as a non-oxidizing gas but has catalytic properties in respect to increasing the relative rate of the decomposition of the ammonium bisulfate. Accordingly, since it serves this dual purpose, it is a preferred non-oxidizing gas of the instant process.

With respect to mercury sulfate either mercuric or mercurous sulfate can be used. The former is formed from the latter in the presence of excess sulfate, the catalytic action presumably arising from the decomposition of the salt at 400° C.:

$$3HgSO_4 \longrightarrow Hg_2SO_4 + Hg + 2SO_2 + 2O_2$$
(Mercuric)  (Mercurous)

It can be readily seen from this table that use of only a slight amount of catalyst as 1% provides a substantial increase in the relative decomposition rate of the ammonium bisulfate. This increase of 4 times the relative rate is a significant improvement in the decomposition of ammonium bisulfate according to the above procedure and permits the recovery of sulfur dioxide rapidly with little expense.

It will be obvious to those skilled in the art that various changes can be made without departing from the teachings of this invention. Therefore, the above disclosures should not be construed as limitative of the invention but only as illustrative, as the invention should only be limited in the light of its spirit and scope.

We claim:
1. A process for producing sulfur dioxide gas from ammonium bisulfate comprising heating said ammonium bisulfate at temperatures between 400 and 500° C. while contacting said ammonium bisulfate with a stream of gas which does not oxidize inorganic sulfites to inorganic sulfates.

2. A process for producing sulfur dioxide gas from ammonium bisulfate comprising heating said ammonium bisulfate at a temperature between 400 and 500° C. while contacting said ammonium bisulfate with a stream of a gas which does not oxidize inorganic sulfites to inorganic sulfates and which has a flow rate of at least .25 ml./minute per gram of NH₄HSO₄ charged.

3. A process according to claim 2 wherein said flow rate is between .25 and 3 ml./minute per gram of NH₄HSO₄ charged.

4. A process according to claim 2 wherein said non-oxidizing gas is hydrogen sulfide.

5. A process according to claim 2 wherein said non-oxidizing gas is nitrogen.

6. A process according to claim 2 wherein said non-oxidizing gas is carbon monoxide.

7. A process according to claim 2 wherein said non-oxidizing gas is carbon dioxide.

8. A process according to claim 2 wherein said non-oxidizing gas is water gas.

9. A process for the decomposition of ammonium sulfate to obtain therefrom ammonia and sulfur dioxide comprising heating ammonium sulfate at temperatures between 200 and 300° C. until substantially all of the ammonia has evolved therefrom, heating the resultant ammonium bisulfate at temperatures between 400 and 500° C. while contacting said ammonium bisulfate with a stream of gas which does not oxidize inorganic sulfites to inorganic sulfates and which has a flow rate of at least .25 ml./minute per gram ammonium bisulfate present and recovering sulfur dioxide from the gas stream.

10. A process according to claim 2 wherein said ammonium bisulfate is decomposed in the presence of a catalyst selected from the group consisting of palladium on charcoal, selenious acid and mercury sulfate.

11. A process according to claim 9 wherein said catalyst is present in amounts between 10 p.pm. and 20,000 p.p.m. based on the amount of ammonium bisulfate decomposed.

12. A process according to claim 9 wherein said catalyst is mercury sulfate.

13. A process according to claim 9 wherein said catalyst is selenious acid.

14. A process according to claim 9 wherein said catalyst consists of 5% palladium on charcoal.

15. A process according to claim 2 wherein said ammonium bisulfate is heated at temperatures between 400° and 460° C.

16. A process according to claim 9 wherein ammonium sulfate is continuously heated and the ammonium bisulfate produced is continuously placed into a second vessel wherein it is heated at temperatures between 400° and 500° C. while in contact with a non-oxidizing gas to produce sulfur dioxide.

References Cited by the Examiner

UNITED STATES PATENTS 2,687,947  8/1954  Manning et al. _____ 23—177

OTHER REFERENCES

Kelly et al.: U.S. Bur. Mines, Tech. Paper, 1946, 688, pages 67 and 68.

Mellor: Comprehensive Treatise on Inorganic and Theoretical Chemistry, vol. 2, page 705 (1922).

OSCAR R. VERTIZ, *Primary Examiner.*

MAURICE A. BRINDISI, *Examiner.*

R. M. DAVIDSON, A. J. GREIF, *Assistant Examiners.*